(12) United States Patent
Waeller et al.

(10) Patent No.: US 7,969,290 B2
(45) Date of Patent: Jun. 28, 2011

(54) INFORMATION DEVICE, PREFERABLY IN A MOTOR VEHICLE, AND METHOD FOR SUPPLYING INFORMATION ABOUT VEHICLE DATA, IN PARTICULAR VEHICLE FUNCTIONS AND THEIR OPERATION

(75) Inventors: Christoph Waeller, Braunschweig (DE); Yongmei Wu, Braunschweig (DE); Thorsten Bohnenberger, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 385 days.

(21) Appl. No.: 12/091,288

(22) PCT Filed: Nov. 8, 2006

(86) PCT No.: PCT/EP2006/010700
§ 371 (c)(1),
(2), (4) Date: Apr. 23, 2008

(87) PCT Pub. No.: WO2007/054284
PCT Pub. Date: May 18, 2007

(65) Prior Publication Data
US 2008/0278298 A1 Nov. 13, 2008

(30) Foreign Application Priority Data

Nov. 11, 2005 (DE) .......................... 10 2005 053 978
Feb. 11, 2006 (DE) .......................... 10 2006 006 338

(51) Int. Cl.
*B60Q 1/00* (2006.01)
(52) U.S. Cl. ........................... 340/438; 340/441; 701/29

(58) Field of Classification Search .................. 340/438, 340/439, 441, 425.5, 428, 429, 426.15, 426.22, 340/426.24; 701/23, 29, 33, 35, 36; 704/10
See application file for complete search history.

(56) References Cited

U.S. PATENT DOCUMENTS

| 6,009,355 | A | 12/1999 | Obradovich et al. | |
|---|---|---|---|---|
| 6,401,029 | B1 | 6/2002 | Kubota et al. | |
| 6,405,111 | B2 * | 6/2002 | Rogers et al. | 701/33 |
| 6,564,128 | B2 * | 5/2003 | Baird et al. | 701/33 |
| 6,956,470 | B1 | 10/2005 | Heise et al. | |
| 2001/0052912 | A1 * | 12/2001 | Ishii et al. | 345/835 |

(Continued)

FOREIGN PATENT DOCUMENTS

DE 199 41 969 12/2000

(Continued)

OTHER PUBLICATIONS

International Search Report, PCT International Patent Application No. PCT/EP2006/010700, dated Mar. 1, 2007.

*Primary Examiner* — Van T. Trieu
(74) *Attorney, Agent, or Firm* — Kenyon & Kenyon LLP

(57) ABSTRACT

An information device, e.g., inside a motor vehicle, includes at least one output device and a processing device, to which a memory device is assigned in which all types of vehicle data, in particular data of vehicle functions and/or vehicle elements, their operation, display or manipulation, and/or data of vehicle states, are stored, and a method is for supplying information about the mentioned vehicle data. The corresponding vehicle data, in particular vehicle functions and their operation or manipulation, and/or vehicle elements and/or their function and/or manipulation, and/or vehicle states and/or their change are displayed in animated fashion on the at least one output device.

21 Claims, 14 Drawing Sheets

Cruise Control System

U.S. PATENT DOCUMENTS

2004/0006460 A1* 1/2004 Katayama et al. ............... 704/10
2004/0225416 A1* 11/2004 Kubota et al. ..................... 701/1
2005/0113991 A1* 5/2005 Rogers et al. ................... 701/29

FOREIGN PATENT DOCUMENTS

| | | |
|---|---|---|
| DE | 199 41 973 | 5/2001 |
| DE | 10 2005 002 277 | 10/2006 |
| DE | 10 2006 052 898 | 5/2007 |
| DE | 10 2006 052 897 | 6/2007 |
| DE | 10 2006 049 965 | 10/2007 |
| EP | 0 893 308 | 1/1999 |
| EP | 1 205 359 | 5/2002 |
| EP | 1 431 127 | 6/2004 |
| EP | 1 462 317 | 9/2004 |
| WO | WO 01/27704 | 4/2001 |

* cited by examiner

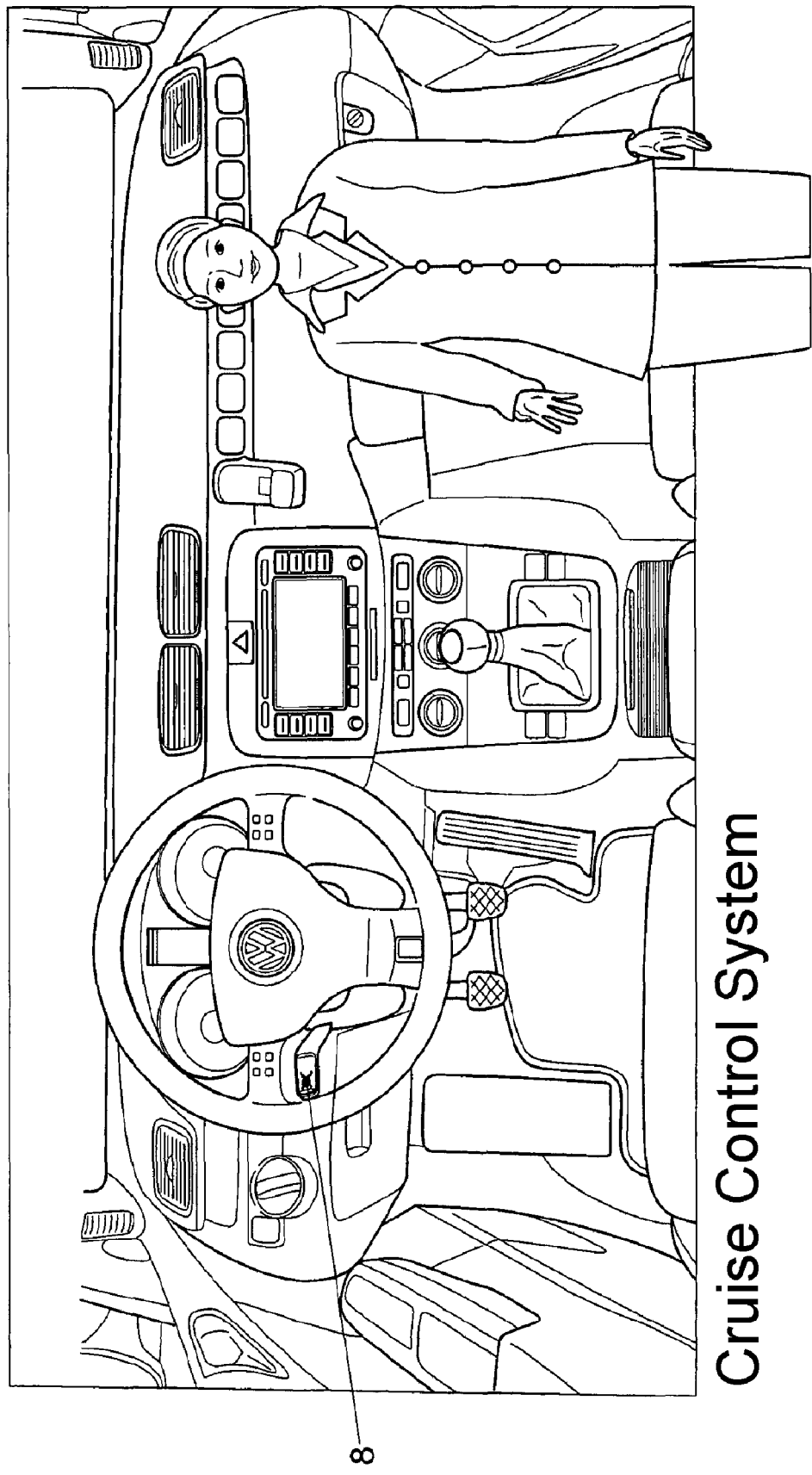
FIG. 3a  Cruise Control System

Cruise Control System

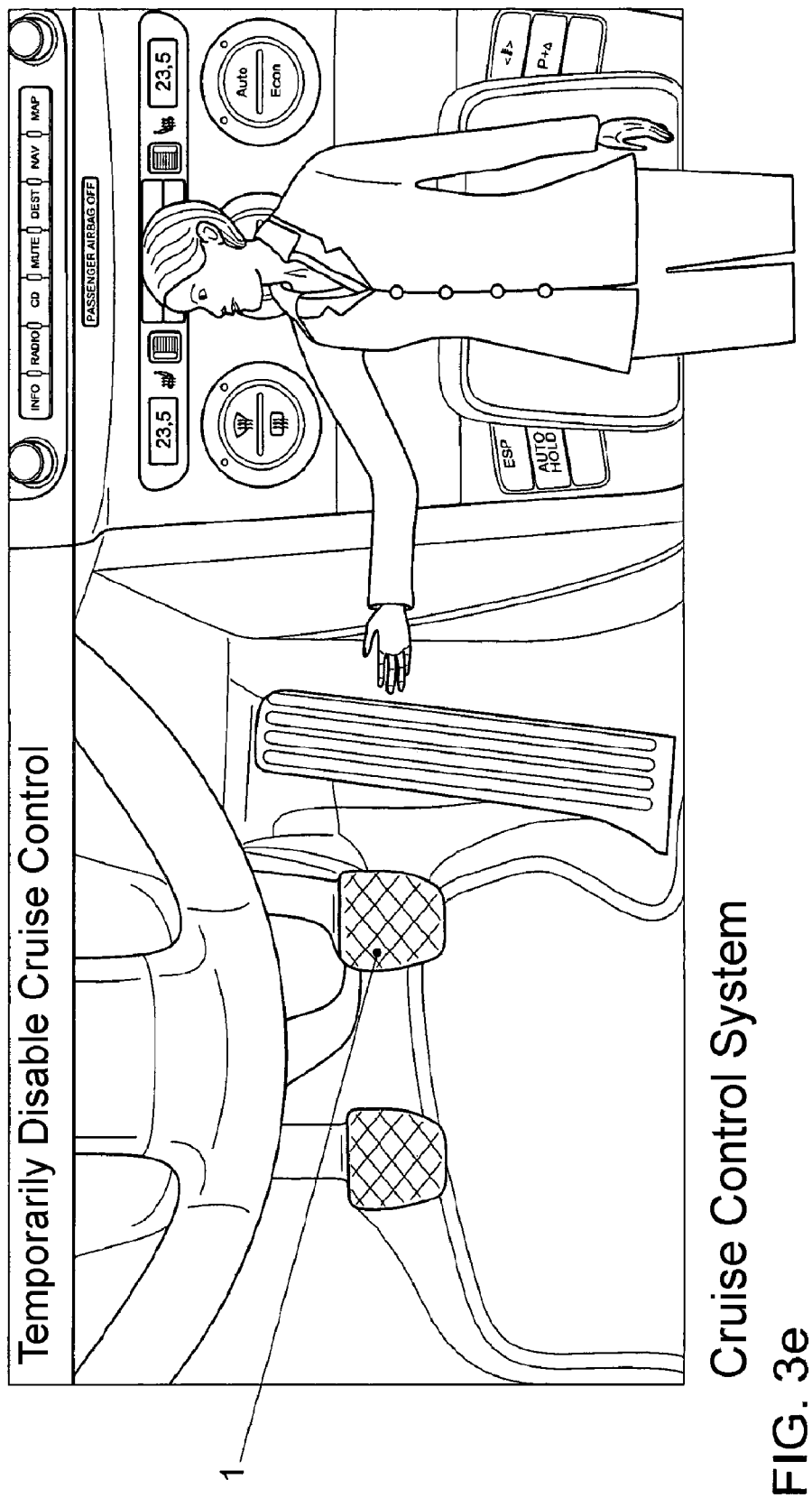
FIG. 3e Cruise Control System

INFORMATION DEVICE, PREFERABLY IN A MOTOR VEHICLE, AND METHOD FOR SUPPLYING INFORMATION ABOUT VEHICLE DATA, IN PARTICULAR VEHICLE FUNCTIONS AND THEIR OPERATION

FIELD OF THE INVENTION

The present invention relates to an information device, e.g., in a motor vehicle, having at least one output device and a processing device to which a memory device is assigned, in which vehicle data, in particular data regarding vehicle functions and/or vehicle elements, their function and/or operation and/or manipulation, and/or data of vehicle states and/or their change are stored, and it relates to a method for supplying information about vehicle data, in particular vehicle functions and/or vehicle elements and their operation, function and/or manipulation, with the aid of an output device.

BACKGROUND INFORMATION

In certain conventional vehicles, all technical features of the motor vehicle and its particular equipment with which the operator should be familiar are generally included in a manual or log book that is provided in printed form. By now, most vehicles are actually equipped with various diagnostic systems for problem detection, both with regard to the state of vehicle components and with regard to critical driving or driver situations. Nevertheless, the problems detected by a diagnostic system prior to or during driving for the most part are indicated to the operator merely with the aid of signal lamps or lit symbols or also by brief text messages or pictograms. The information transmitted in this manner indicates a particular problem with the vehicle; to remedy the problem, it is usually necessary to consult a manual, a printed copy of which is stored in the glove compartment, for instance. The manual is typically utilized only when the driver encounters a problem with the vehicle or its operation. The use of the manual is generally perceived as time-consuming, complex and quite cumbersome since many users dislike reading longer printed texts and, in particular, find comprehensive technical contents rather daunting.

PCT International Published Patent Application No. WO 01/27704 describes a method for preparing documents or information for a technical product that can be produced in series and on the assembly line; a product book is produced directly on the assembly line during the production process. The product book includes the essential technical features of the product, notes the suggestions relevant to the use and/or operation of the product, and lists the individual equipment particulars that are characteristic of the specific product item, the product book being specially assigned to this product and geared toward it. The product book can also be prepared as EDP data set. The goal of this method is the preparation of a product book which is easy to understand and provides useful information while avoiding unnecessary stock-keeping and reducing the expense to a minimum; the product book should dispense with superfluous information as much as possible yet still cover the individual special equipment of a product. However, the method provides no help when problems arise during use, and the user, through his own research endeavors, must first consult the product book on his own in order to locate and identify information therein that is relevant to the existing problem, then absorb and analyze this information and interpret it using his own level of experience, only to be forced then to decide which measures to take to solve the problem. Even if a readily comprehensible product book is available, this approach provides little comfort, is complex and time-consuming, and, furthermore, bears the inherent risk that the user will arrive at faulty conclusions and decisions. German Published Patent Application No. 199 41 973 describes a method and a device for actively assisting a motor vehicle driver with the aid of at least one control device and an input and display unit. The control device has access to the data of sensors and control devices and/or comfort control devices and/or internal or external data bases relevant to the vehicle state, thereby providing automatic assistance in the communication between the vehicle driver and the vehicle system. The control device, in particular, detects a critical vehicle state by evaluating the data of the vehicle-relevant sensors and control devices, whereupon a list of possible actions on the part of the vehicle driver in response to the detected critical vehicle state is prepared, the detected critical vehicle state and the possible actions by the vehicle driver are displayed on the display unit, and an action selected by the vehicle driver is carried out by the control device. However, the information offered by the system is always displayed only as text in the form of lists. No modification of the type of information output is provided. Furthermore, since the described system is not an information device but a system for active assistance by automatic execution of actions with the aid of a control device, this system is also not suitable for providing the user with the greatest possible amount of information about vehicle-internal processes or technical details and for explaining to him the implementation of possible measures in the most comprehensible fashion possible.

In addition, German Published Patent Application No. 10 2005 002 277 describes an information system for a vehicle having a data-processing device and a display device for displaying stored information, which is selectable with the aid of an operating device, the information involving information of an electronic advice manual. Individual chapters of the advice manual are selectable via the operating device for display by the display device. Among other things, the electronic advice manual can include instructions for responding in an emergency, e.g., a breakdown, as well as instructions regarding first-aid measures.

SUMMARY

Example embodiments of the present invention provide a device for displaying information about vehicle functions, and a method for supplying information about vehicle data, especially vehicle functions as well as their operation and display, with whose aid a user is able to learn the operation and manipulation of the vehicle functions and the function of operating devices and operating elements in an uncomplicated manner.

According to example embodiments of the present invention, vehicle data, in particular vehicle functions and their operation and manipulation, e.g., via operating devices assigned to the vehicle functions, and/or vehicle elements and/or their function and/or manipulation, and/or vehicle states and/or their variations, are displayed in animated fashion on an output device arranged as display device. This may be implemented by visually displaying, for instance, the operating devices or vehicle elements or vehicle states in their setup in the motor vehicle on the display device. According to example embodiments of the present invention, the operation of the operating devices, possibly together with their effect on the vehicle function, the manipulation of the vehicle elements and possibly their movement during the manipulation, and/or the change in the vehicle states is displayed in animated fashion on the display device. Thus, the user is offered an easily comprehensible display of the functions and the vehicle elements, which helps him use them correctly.

The visual and acoustical explanation of the vehicle functions, their operation and/or manipulation, and/or the vehicle elements, possibly together with their manipulation, and/or of the vehicle states may be implemented with the aid of an animated display of an artificial person, which is generally referred to as an avatar, on the display device; appropriate acoustic supplementation is provided via voice output. The avatar may be provided such that the visual and acoustic explanations are supplemented by corresponding motions of the avatar. In other words, the avatar moderates the information playback. In this manner, the user obtains the appropriate information in a manner that is even more comprehensible and easier to absorb.

The operating device assigned to the vehicle function currently to be explained, possibly an associated display on the display device, and/or a vehicle element currently to be explained may be displayed on the display device in an optically highlighted or optically variable manner for better visualization.

In addition to the display of the operating device of the vehicle function currently to be explained, and/or the vehicle element in the static state, it is possible to display the operating device in its operating movement and the vehicle element in its operating movement for better exemplification.

The operating element of the vehicle function currently to be explained, or the vehicle element currently to be explained may be displayed on the display device in a different size as a function of the current information output. For instance, if the user is to be informed about the location of the operating element or the vehicle element in the vehicle, then the display of the operating element or the vehicle element on the display device is implemented within the context of the other operating elements or vehicle components, and its display on the display device is relatively small. If the operating element or the vehicle element is to be explained as such or in its function, then it may be zoomed out of the overall context and displayed at a correspondingly larger size in comparison with the detail information.

The at least one output device arranged as a display device may be part of what is generally referred to as a multi-function operating device in the vehicle, which is used, among others, to operate audio devices or a navigation system installed in the vehicle. The information playback may then be called up as help menu, e.g., with the aid of an operating device of the multi-function operating device.

In the following text, example embodiments of the present invention are explained in greater detail with reference to the appended Figures.

BRIEF DESCRIPTION OF THE DRAWINGS

FIGS. 3a to 3g illustrates a method sequence to explain a cruise control system.

DETAILED DESCRIPTION

Figure 1:
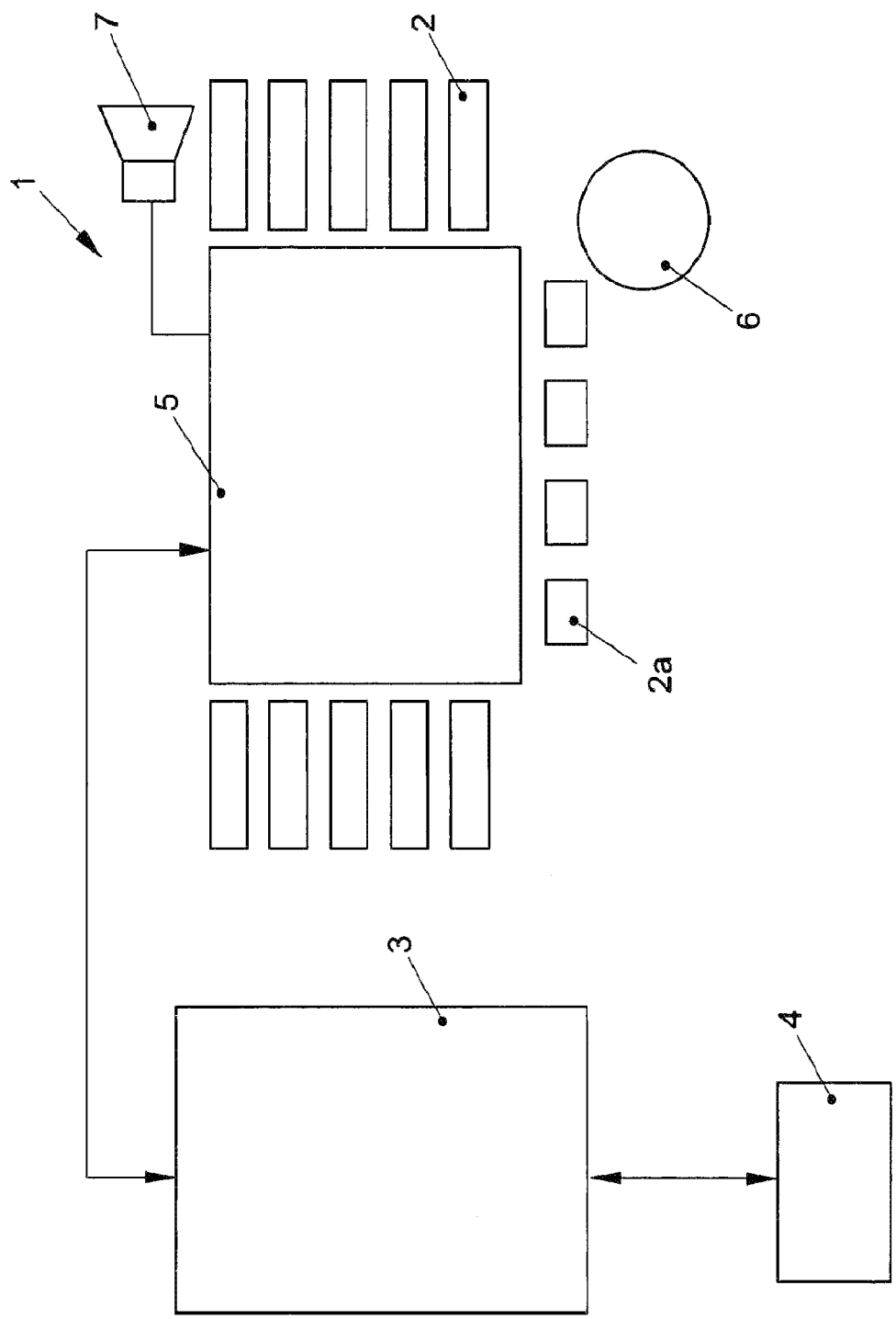
FIG. 1 is a schematic representation of an information device using a multi-function operating device.
Figure 2:
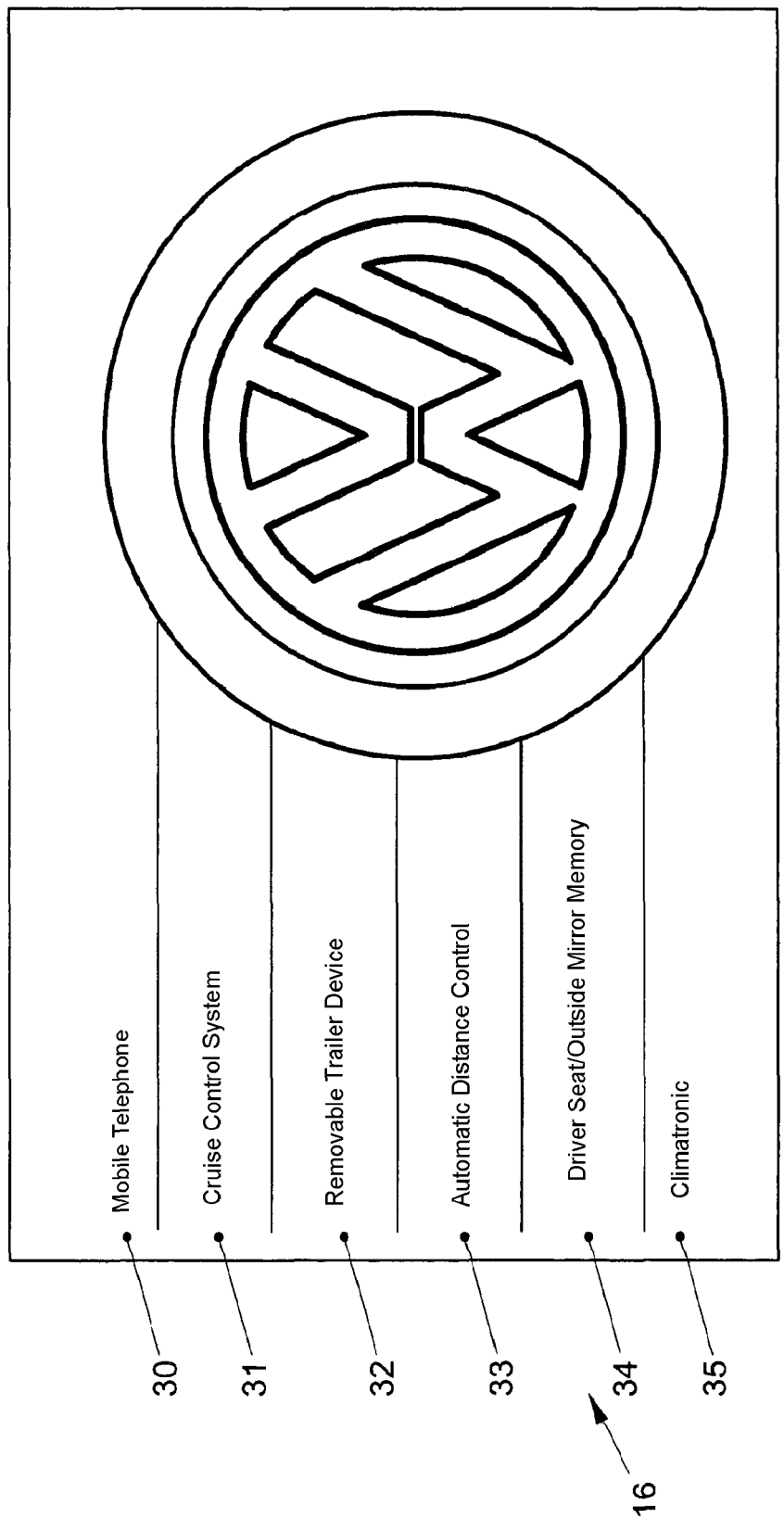
FIG. 2 illustrates a display of a main menu on the display device for calling up information about functionalities of the motor vehicle.
Figure 3B:
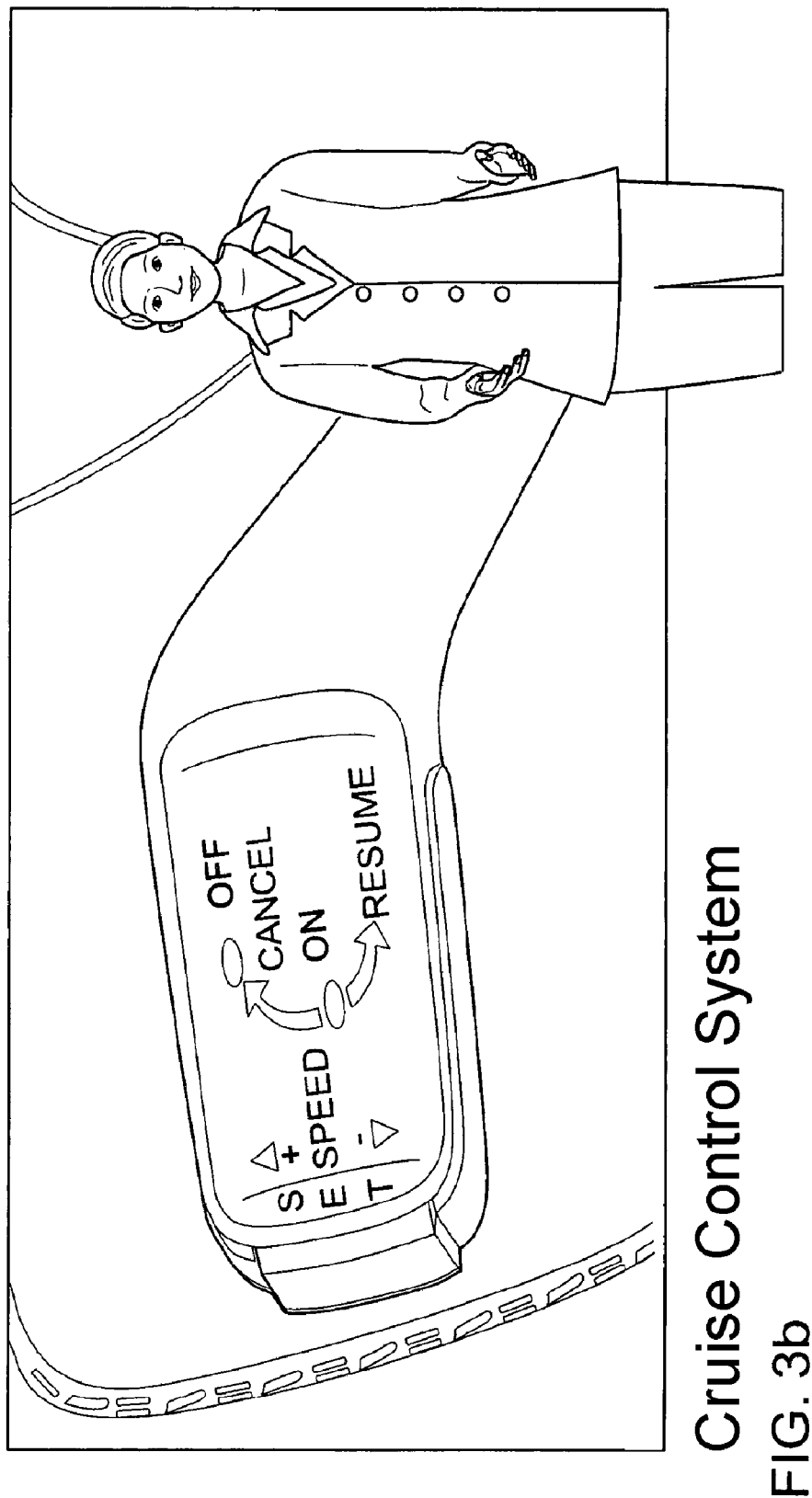
Figure 3C:
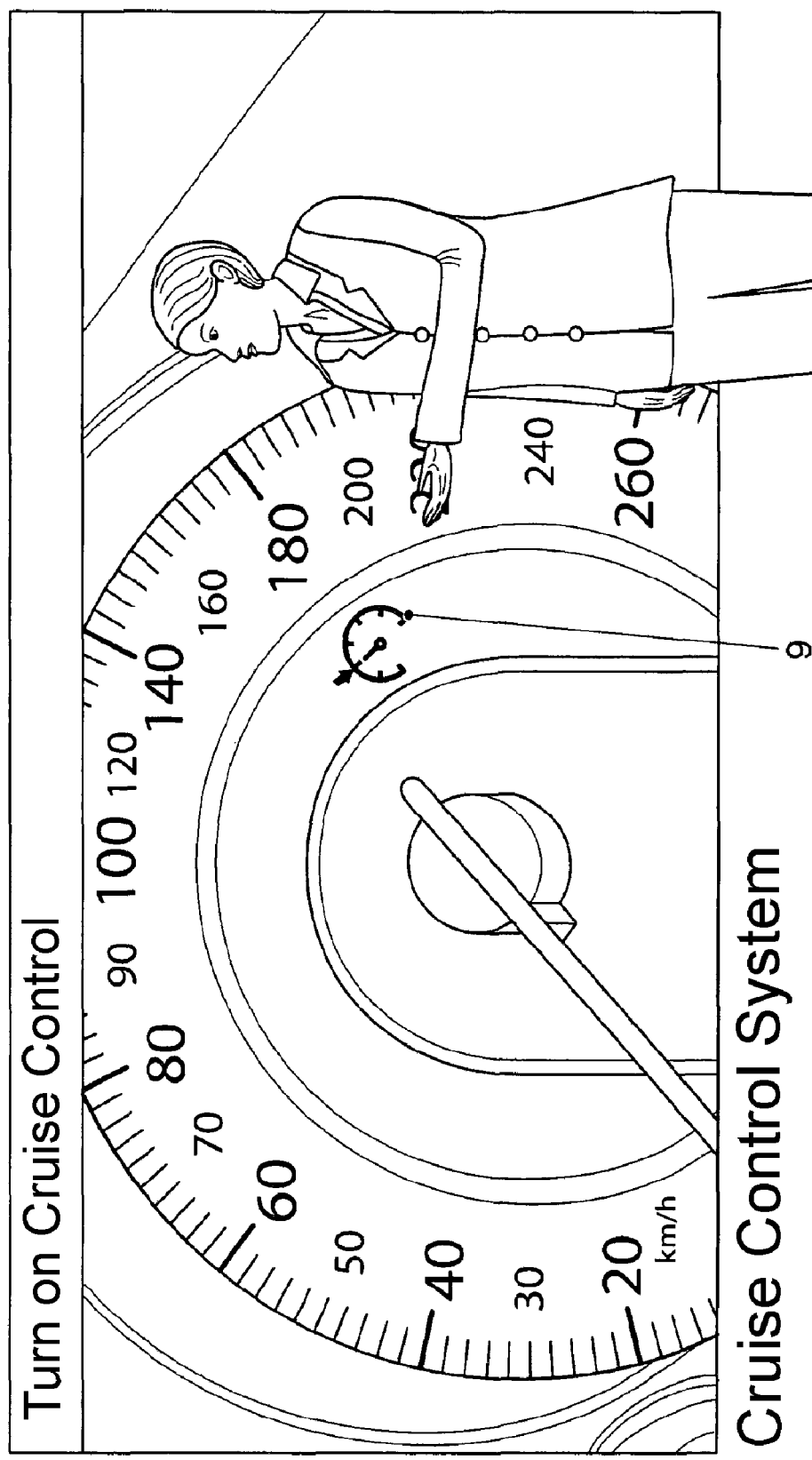
Figure 3D:
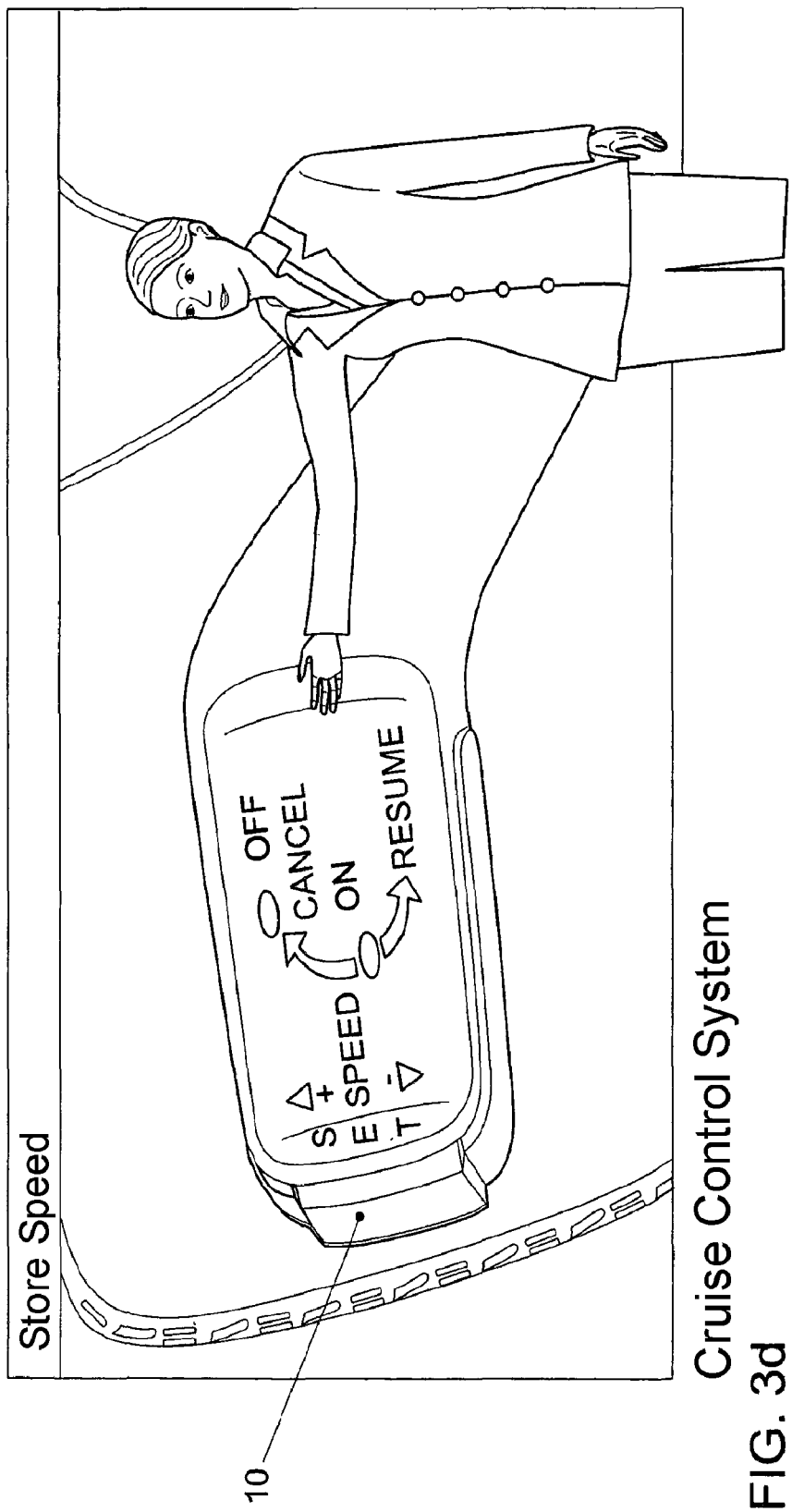
Figure 3F:
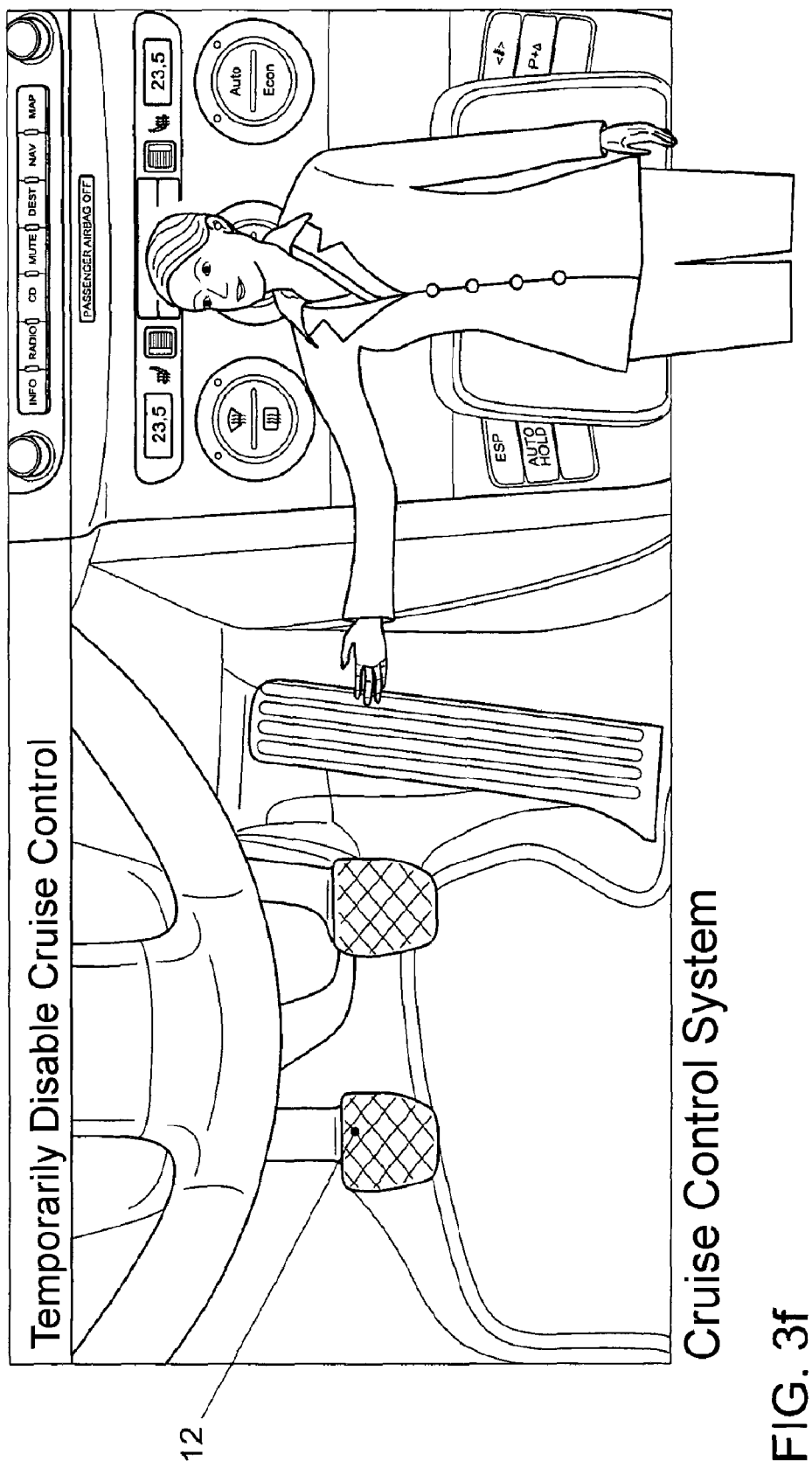
Figure 3G:
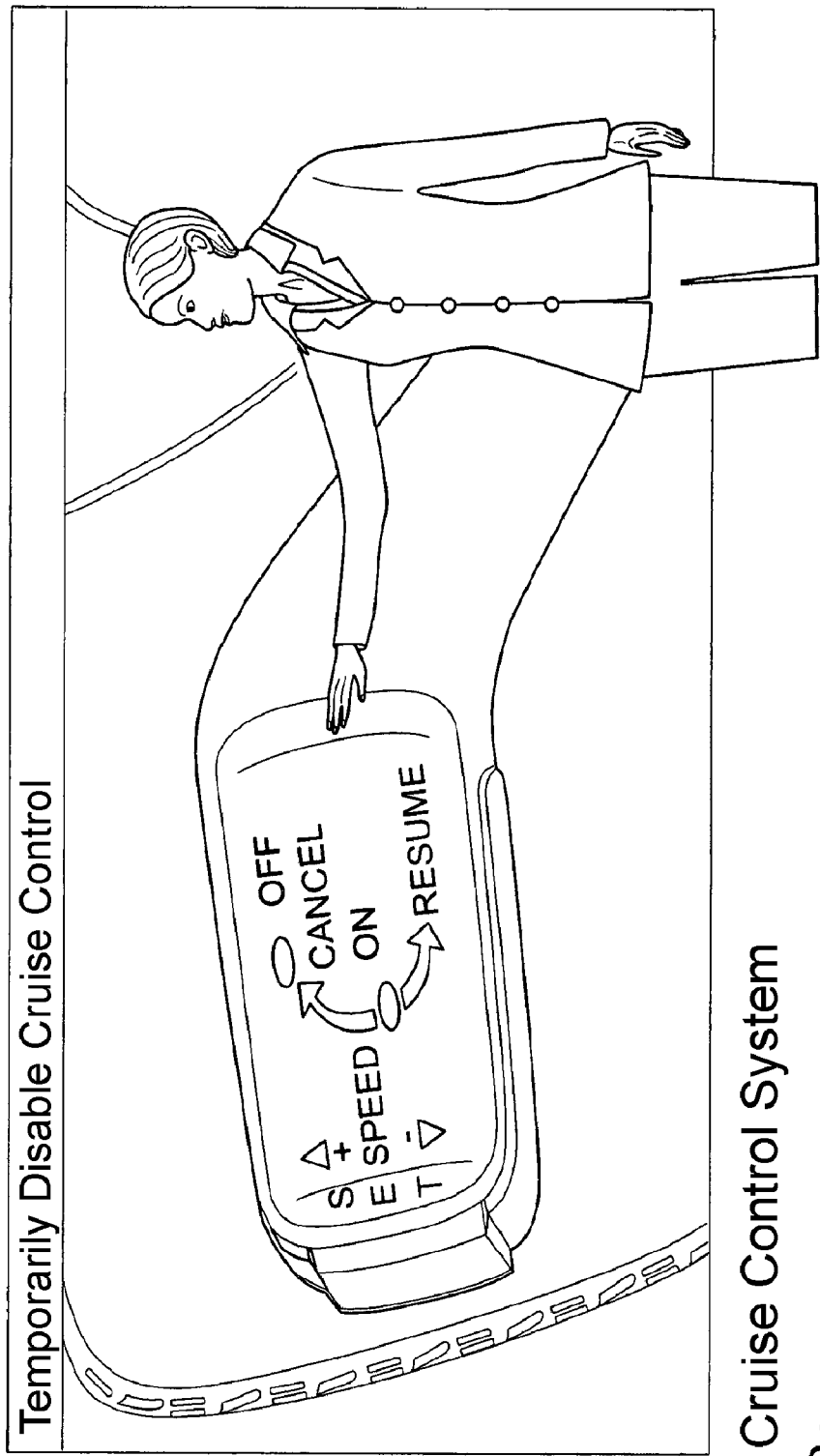
Figure 4A:
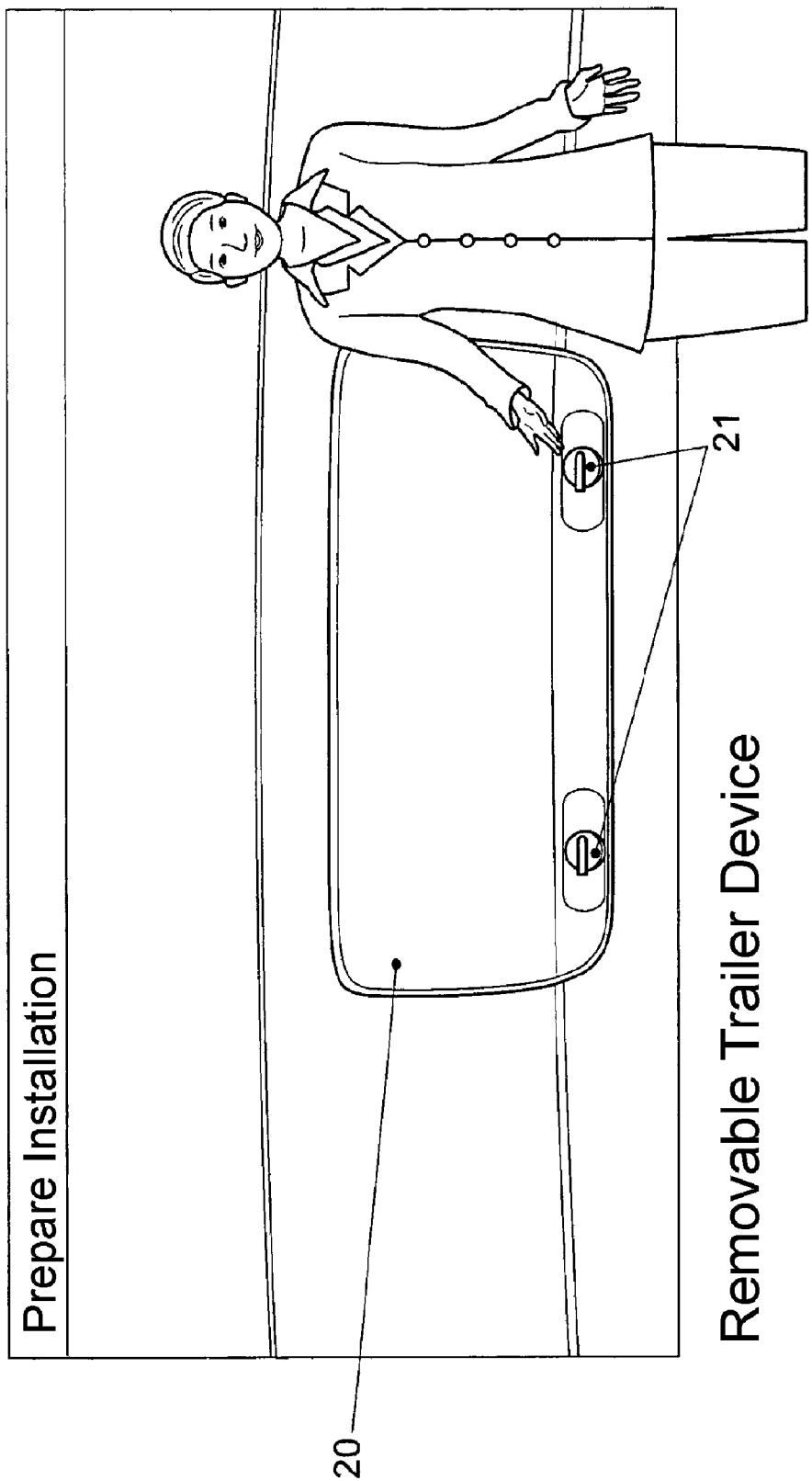
FIGS. 4a to 4e illustrates a method sequence for installing a removable trailer device.
Figure 4B:
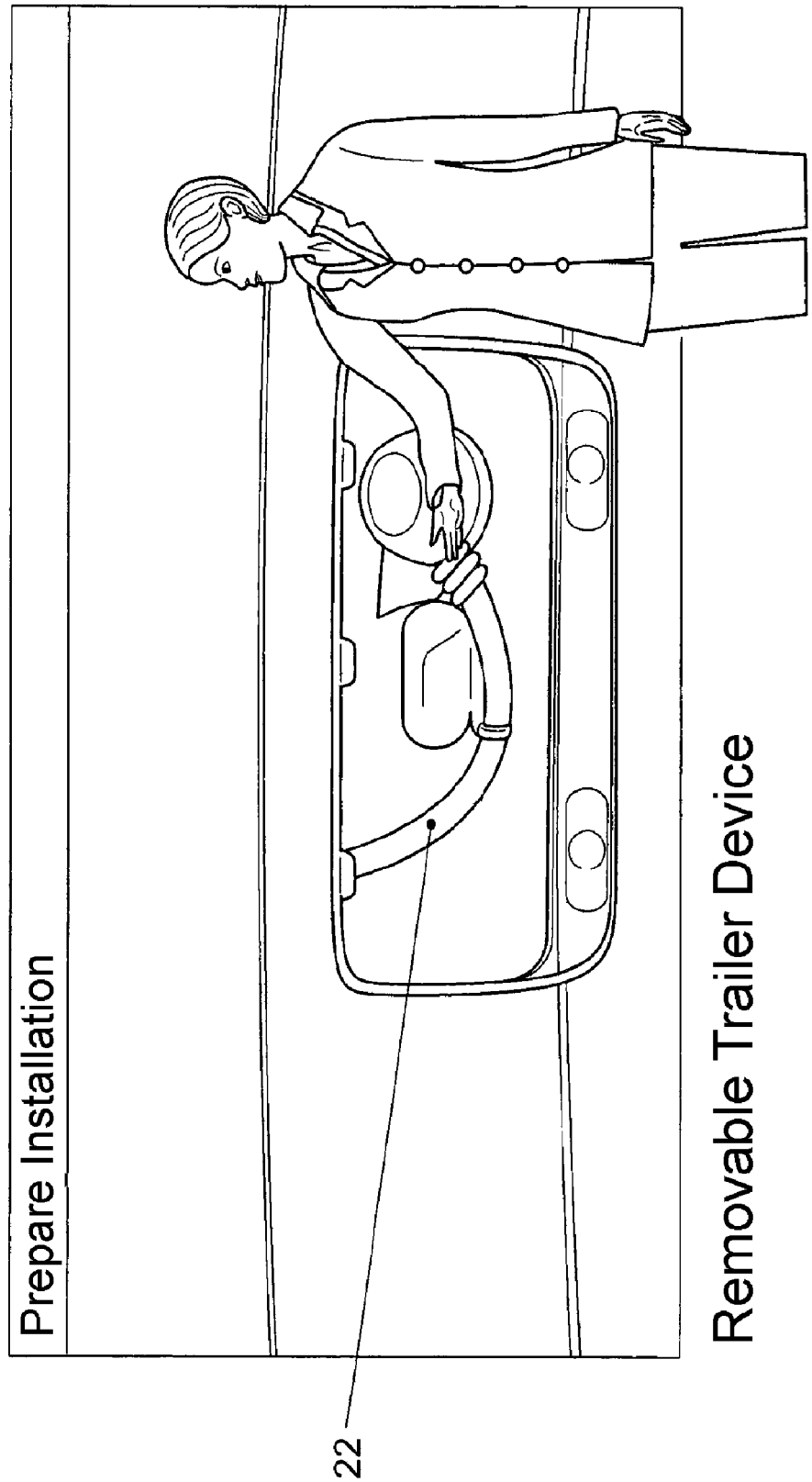
Figure 4C:
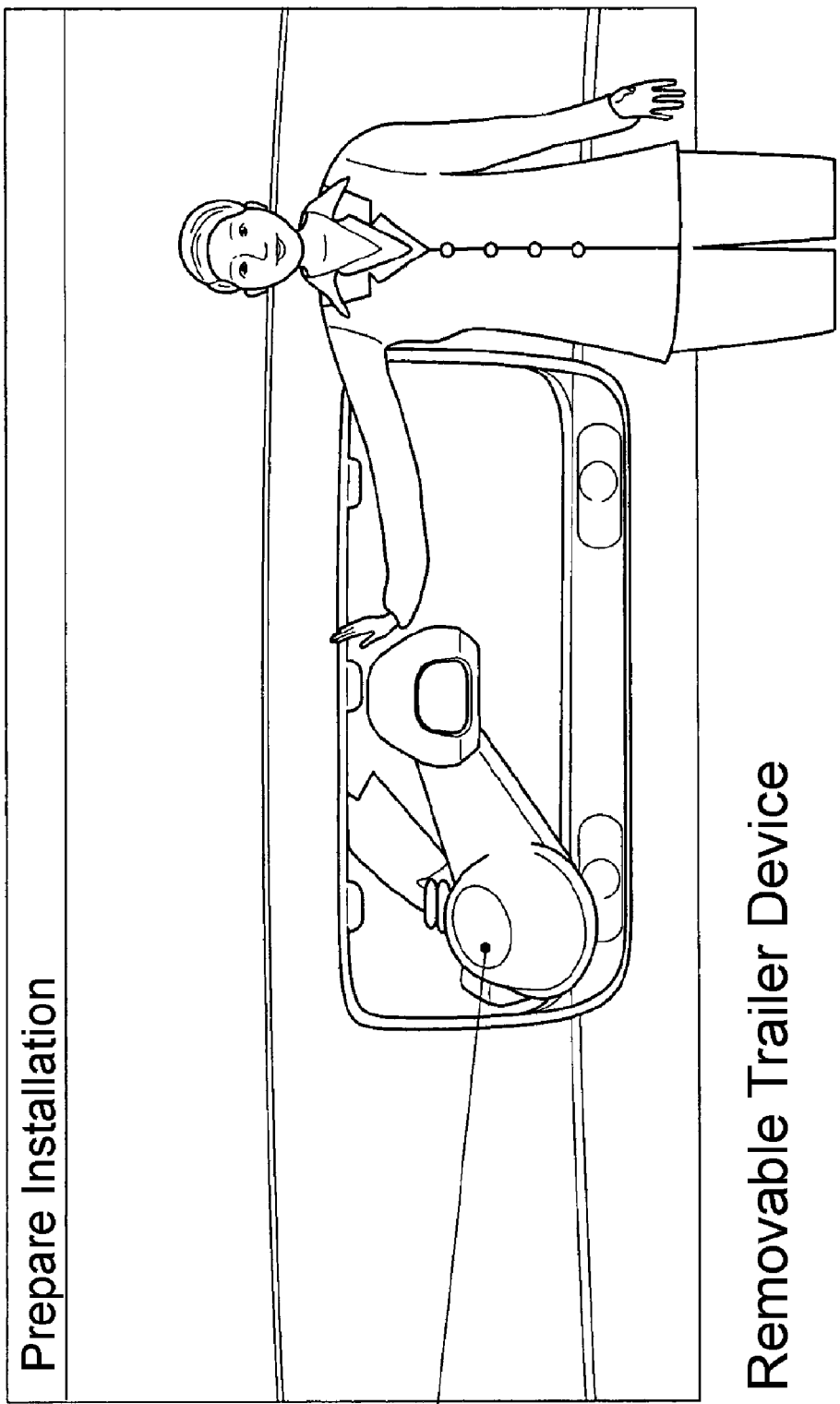
Figure 4D:
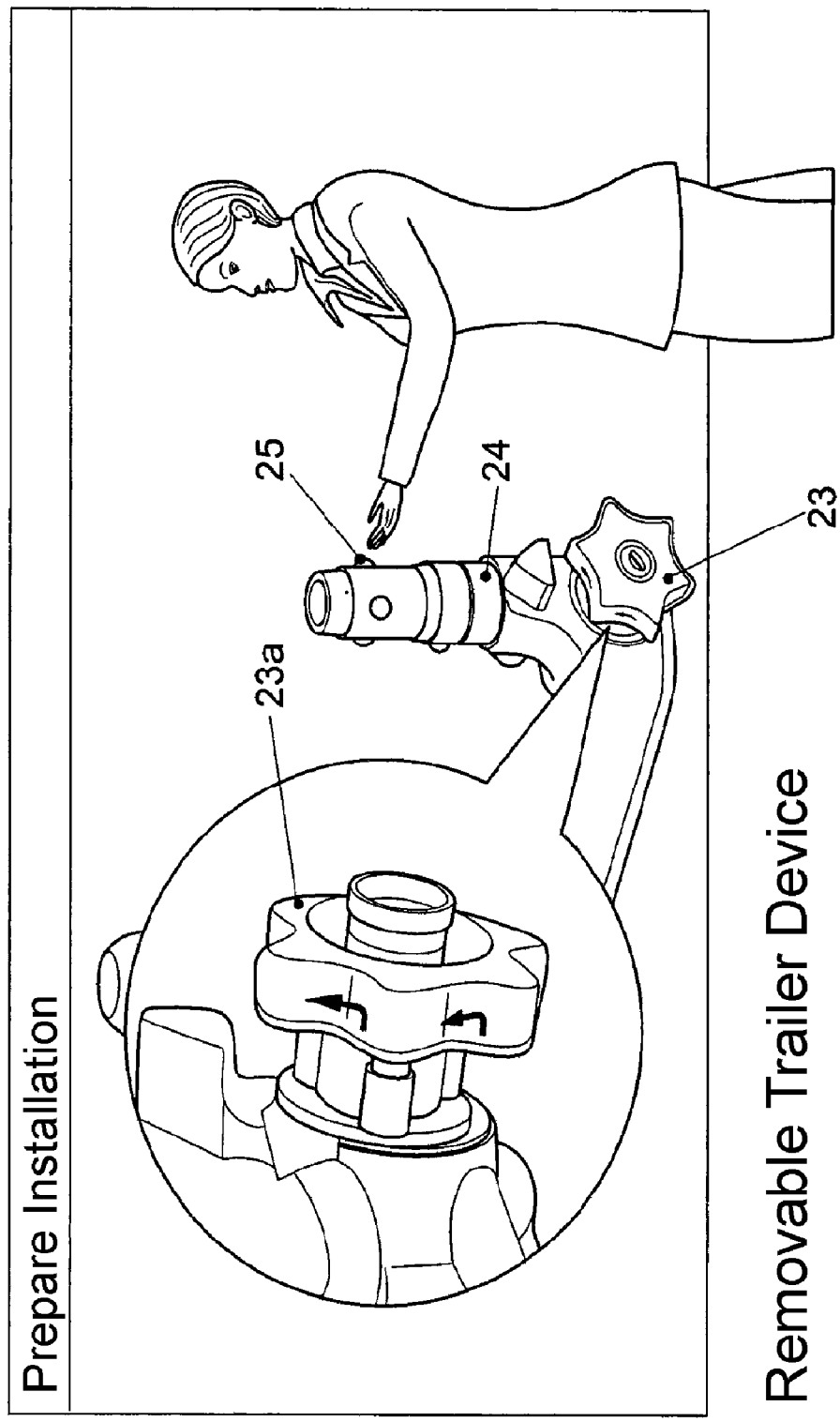
Figure 4E:
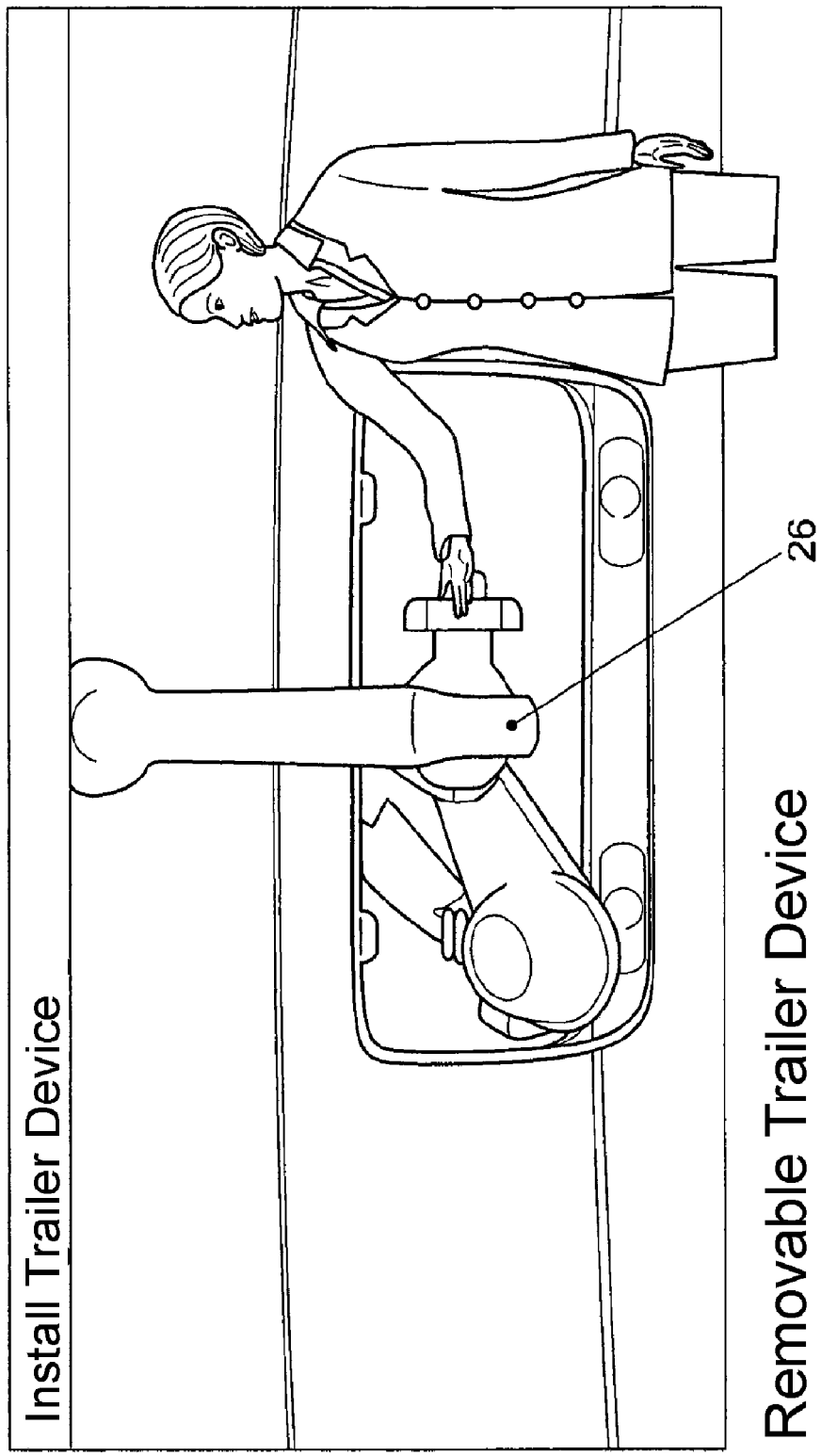

The information device according to example embodiments of the present invention for explaining and in assisting in the driving and operation of motor vehicles according to FIG. 1 includes a processing device 3 and a memory 4 connected thereto or integrated therein. Vehicle data, in particular data of vehicle functions, their operating devices and displays, as well as data of vehicle elements and components and also their function or manipulation, and/or vehicle states and their variations are stored in the memory. Vehicle functions may be, for example, the function and operation of driver-assistance systems, navigation systems or electric window raisers. Vehicle elements should be understood as, e.g., a seat and/or its de-installation sequence or the installation of a removable trailer device. Memory 4 may substantially include all of the information that is generally also part of current operating manuals, even if this information is provided in different form. In the exemplary embodiment, processing device 3 is connected to a multi-function operating device 1 or integrated therein, which is disposed in the vehicle, e.g., in the center console. One such multi-function operating device is described in German Published Patent Application No. 199 41 969, for instance. Other arrangements of multi-function operating devices are possible, among them also a device provided as a touch screen. Via a menu structure, multi-function operating device 1 provides for the operation of different electronic devices of the motor vehicle, e.g., a navigation system or audio systems, and applications. In the exemplary embodiment, an operating element 2a of operating device 2 is provided, which is used to call up a help menu 16 according to FIG. 2. Vehicle functions, vehicle elements, and/or vehicle states about which the user wishes to receive information, such as with regard to their use, display in the vehicle or their manipulation, are selectable via this help menu 16. In the exemplary embodiment, these are mobile telephone 30, cruise control system 31, the manipulation of detachable trailer device 32, automatic distance controller 33, the operation of the memory function for driver seat and outside mirror 34, and air conditioning system 35. However, the call-up of other and additional functionalities, as well as the function and selection of the electronic devices and applications that are able to be operated with the aid of the multi-function operating device, e.g., the navigation device, may be provided as well. If a larger number of explicable functions and vehicle elements is involved, then the functions and vehicle elements may be combined into groups in the main menu. After selecting a function group, the individual function may be selected in a submenu. The selection of the particular functionalities in the exemplary embodiment takes place via press/turn element 6 or operating elements 2 arranged as soft keys. If a touch screen is used, then the selection is made by touching the particular touch screen operating element.

FIG. 3 shows the information sequence to explain the cruise control system following its selection, with the aid of a film displayed on display device 5, in which avatar 15 provides explanatory support by hand and body motions as well as voice output. After the selection, the image from FIG. 3a appears. Avatar 15, using hand and body motions and speech output via acoustic output device 7 (FIG. 1), states: "I will show you how to operate the electronic cruise control system, abbreviated CCS". FIG. 3a shows the cockpit of the vehicle with all its display and operating devices. Operating device 8 of the cruise control system together with all its operating elements is highlighted in color. This is followed by the display image of FIG. 3b. In comparison with the representation in FIG. 3a, operating device 8 is brought closer by zooming and takes up the greatest part of the display surface; here too, it is shown highlighted in color in comparison with the background. Avatar 15 offers information about the function of the cruise control system: "The cruise control system constantly maintains a set speed between 30 and 210 k/h." Avatar 15 provides information about the activation of the cruise control system. "Pull this lever in the direction of the steering wheel until it engages". In the film, operating device 8 moves in the direction of the user. FIG. 3c, which displays a detail of the instrument cluster including the speed display and symbol 9, is displayed in the film sequence. Avatar 15 indicates by a hand movement and the speech output: "After activation, this symbol appears on the instrument cluster". Avatar 15 goes on to explain how to set and store the desired speed: "Drive at the desired speed and press the set key on the side of the lever". For better visibility, set key 10 is highlighted in contrast to the rest of the operating device (see, e.g., FIG. 3d). After the speed has been set, avatar 15 explains the option of increasing or decreasing the stored speed in a similar manner. FIGS. 3e to 3g are utilized to illustrate the manner in which the temporary deactivation of the cruise control system is explained with the aid of avatar 15. In the figures, the particular operating element—brake pedal 11, clutch pedal 12 or operating lever 8—, which may be used for the deactivation, is highlighted in comparison to the background. In addition, the explanation of the operating function is supplemented by the movement and the speech output of avatar 15. "Depress the brake pedal; in vehicles with a manual transmission, depress the clutch pedal or press the operating lever slightly away from the steering wheel. To reactivate the cruise control system, release the brake pedal or the clutch pedal and lightly pull the operating lever toward the steering wheel".

FIG. 4 shows the animated sequence to explain the installation of the detachable trailer device with the aid of several fixed images. At the beginning, avatar 15 explains: "The detachable trailer device is located underneath the trunk floor with the onboard tools. I will show you how to install and uninstall the trailer device. Remove the cover underneath the rear shock absorber by rotating both quick-release closures by 90 degrees". A portion of the rear shock absorber together with cover 20 is shown on the display device. Cover 20 is highlighted against the shock absorber using color. In addition, quick release closures 21 are displayed, which are highlighted against the cover using color for easy visibility. The film shows the manner and direction in which rapid release closures 21 must be turned in order to allow the removal of the cover. Using hand and body motions, avatar 15 points to cover 20 and the quick release closures. Next, the installation of the trailer device on the trailer connector plug is explained. FIG. 4b shows the storage compartment with the trailer connector plug as part of the installation sequence. Aided by its hand and body motions, avatar 15 explains: "Rotate the trailer connector plug sideways as far as it will go, which will provide access to the receptacle for the ball head". With the aid of a selective motion of avatar 15, the display device displays the rotational movement of trailer connector plug 22 from its original position illustrated in FIG. 4b to the rotated position illustrated in FIG. 4c. "Check whether the receptacle, the hand-wheel, the shaft and the locking balls of the trailer device are clean and undamaged". Using color, hand-wheel 23, shaft 24 and locking balls 25 are highlighted one after the other within the context of the corresponding speech output of avatar 15. Avatar 15 goes on: "The trailer device can be properly mounted only if the coupling device is prestressed. You prestress the coupling device by pulling out the hand-wheel using the right hand (the hand-wheel 23a, shown in enlarged size, is highlighted again using color (FIG. 4d)), retain it in this position, and turn the hand-wheel in the direction of the arrow. Now the ball head is prestressed. This is the way to mount the trailer device (FIG. 4e). Guide the prestressed trailer device into the receptacle, push the trailer device forcefully in the upward direction until it engages. (Here, too, trailer device 26 is highlighted using color; trailer device 26 changes color again once the engagement has been demonstrated). Then it must be checked whether the trailer device was installed correctly. Turn the key to the left, remove it, and place the cover on top".

LIST OF REFERENCE SYMBOLS 1 multi-function operating device
2 operating device
2a operating element
3 processing device
4 memory
5 display device
6 turn/push element
7 output device
8 operating device, operating lever
9 symbol
10 key
11 brake pedal
12 clutch pedal
15 artificial, animated person, avatar
16 help menu
20 cover
21 quick-release closures
22 trailer connector plug
23 hand-wheel
23a hand-wheel
24 shaft
25 locking balls
26 trailer device
30 mobile telephone
31 cruise-control system
32 removable trailer device
33 automatic distance control
34 driver seat/outside mirror-memory
35 Climatronic

What is claimed is:

1. An information device in a motor vehicle, comprising:
a processor device;
at least one memory device assigned to the processor device, the memory adapted to store vehicle data; and
at least one output device configured to output the vehicle data in at least partially animated manner;
wherein at least one of (a) an operating device of at least one vehicle function and (b) at least one associated display is optically displayable in its arrangement in the motor vehicle on at least one output device arranged as a display device, the at least one output device configured to demonstrate at least one of (a) optically and (b) acoustically the function of the at least one of (a) the operating device and (b) the associated display.

2. The information device according to claim 1, wherein the vehicle data includes at least one of (a) data of vehicle functions, (b) data of vehicle components, (c) data of at least one of (i) function, (ii) operation, and (iii) manipulation of vehicle components, (d) data of at least one of (i) function, (ii) operation, and (iii) manipulation of vehicle functions, and (e) data of vehicle states, the at least one output device configured to output at least one of (a) at least one of (i) the operation and (ii) the manipulation of at least one of (i) vehicle functions and (ii) vehicle components and (b) a change of vehicle states in at least partially animated manner.

3. The information device according to claim 1, wherein the at least one of (a) the optical and (b) the acoustic demonstration of the at least one of (a) the vehicle function and (b) the operating device is implemented via an animated display of an artificial person on the display device and an acoustic output device.

4. The information device according to claim 1, wherein the operating device assigned to an operating function currently to be demonstrated is at least one of (a) optically highlighted and (b) optically variable on the display device.

5. The information device according to claim 1, wherein an operating movement of the operating device assigned to an operating function currently to be demonstrated is displayable.

6. The information device according to claim 1, wherein the optical display of the operating device assigned to an operating function currently to be demonstrated on the at least one display device is at least one of (a) displayable in variable size and (b) zoomable.

7. An information device in a motor vehicle, comprising:
a processor device;
at least one memory device assigned to the processor device, the memory adapted to store vehicle data; and
at least one output device configured to output the vehicle data in at least partially animated manner;
wherein at least one of (a) at least one vehicle component, (b) a function of the at least one vehicle component, and (c) a manipulation of the at least one vehicle component is optically displayable, in its arrangement in the motor vehicle, on at least one output device arranged as a display device, and at least one of (a) the function of the at least one vehicle component and (b) the manipulation of the at least one vehicle component is demonstrated at least one of (a) optically and (b) acoustically by animation.

8. The information device according to claim 7, wherein the at least one of (a) the optical and (b) the acoustic demonstration of the at least one of (a) the at least one vehicle component, (b) the function of the at least one vehicle component, and (c) the manipulation of the at least one vehicle component is implemented via an animated display of an artificial person on at least one of (a) the display device and (b) an acoustic output device.

9. The information device according to claim 7, wherein the vehicle component currently to be demonstrated is at least one of (a) optically highlightable and (b) optically variable on the display device.

10. The information device according to claim 7, wherein at least one of (a) the manipulation and (b) the function of the vehicle component is displayable on the display device.

11. The information device according to claim 1, wherein the at least one output device is part of a multi-function operating device, and a demonstration of the vehicle data may be called up via a help menu.

12. A method, comprising:
outputting, in at least partially animated fashion by at least one output device, information about vehicle data, including at least one of (a) vehicle functions, (b) vehicle components, (c) at least one of (i) operation, (ii) function, and (iii) manipulation of vehicle functions, (d) at least one of (i) operation, (ii) function, and (iii) manipulation of vehicle components, (e) movement of vehicle components, (f) vehicle states, and (g) change of vehicle states;
wherein the outputting includes:
displaying on at least one output device arranged as a display device at least one of (a) operating devices of at least one of (i) vehicle functions and (ii) operating functions and (b) at least one associated display; and
demonstrating at least one of (a) optically and (b) acoustically via an animated display a function of the at least one of (a) the operating devices and (b) the at least one associated display.

13. The method according to claim 12, wherein the at least one of (a) the optical and (b) the acoustic demonstration at least one of (a) takes place and (b) is implemented via an animated display of an artificial person on the display device and an acoustic output device.

14. The method according to claim 12, wherein the operating device corresponding to the vehicle function to be demonstrated is at least one of (a) optically emphasized and (b) varied on the display device.

15. The method according to claim 12, wherein an operating movement of the operating device to be demonstrated is displayed on the display device.

16. The method according to claim 12, wherein the optical display of the operating device currently to be demonstrated is at least one of (a) enlargeable and (b) reducible in size on the display device.

17. The method according to claim 16, wherein at least one of (a) an enlargement and (b) a reduction in size of the display is implemented as a function of a demonstrative sequence of at least one of (a) the vehicle function and (b) the operating device assigned to the vehicle function.

18. A method, comprising:
outputting, in at least partially animated fashion by at least one output device, information about vehicle data, including at least one of (a) vehicle functions, (b) vehicle components, (c) at least one of (i) operation, (ii) function, and (iii) manipulation of vehicle functions, (d) at least one of (i) operation, (ii) function, and (iii) manipulation of vehicle components, (e) movement of vehicle components, (f) vehicle states, and (g) change of vehicle states;
wherein the outputting includes:
optically displaying at least one vehicle component in an arrangement in a motor vehicle; and
at least one of (a) optically and (b) acoustically demonstrating at least one of (a) a function and (b) a manipulation of the vehicle component by animation.

19. The method according to claim 18, wherein the at least one of (a) the optical and (b) the acoustic demonstration of at least one of (a) the vehicle component, (b) the function of the vehicle component, and (c) the manipulation of the vehicle component at least one of (a) takes place and (b) is implemented via an animated display of an artificial person on at least one of (a) a display device and (b) an acoustic output device.

20. The method according to claim 18, wherein the vehicle component currently to be demonstrated is at least one of (a) optically emphasized and (b) optically varied on a display device.

21. The method according to claim 18, wherein at least one of (a) the manipulation and (b) the function of the vehicle component is displayed on a display device.

* * * * *